(12) United States Patent
Nevatia et al.

(10) Patent No.: US 8,131,011 B2
(45) Date of Patent: Mar. 6, 2012

(54) HUMAN DETECTION AND TRACKING SYSTEM

(75) Inventors: Ramakant Nevatia, Pacific Palisades, CA (US); Bo Wu, Mountain View, CA (US)

(73) Assignee: University of Southern California, Los Angeles, CA (US)

( * ) Notice: Subject to any disclaimer, the term of this patent is extended or adjusted under 35 U.S.C. 154(b) by 981 days.

(21) Appl. No.: 11/860,743

(22) Filed: Sep. 25, 2007

(65) Prior Publication Data

US 2008/0123968 A1    May 29, 2008

Related U.S. Application Data

(60) Provisional application No. 60/826,790, filed on Sep. 25, 2006.

(51) Int. Cl.
*G06K 9/00* (2006.01)
(52) U.S. Cl. .................................................. 382/103
(58) Field of Classification Search ................... 382/103
See application file for complete search history.

(56) References Cited

U.S. PATENT DOCUMENTS

| | | | |
|---|---|---|---|
| 5,930,379 A * | 7/1999 | Rehg et al. ............... | 382/107 |
| 5,930,391 A * | 7/1999 | Kinjo ........................ | 382/173 |
| 6,081,619 A * | 6/2000 | Hashimoto et al. ...... | 382/181 |
| 6,240,198 B1 * | 5/2001 | Rehg et al. ............... | 382/103 |
| 6,795,567 B1 * | 9/2004 | Cham et al. .............. | 382/103 |
| 6,973,201 B1 * | 12/2005 | Colmenarez et al. .... | 382/103 |
| 7,257,237 B1 * | 8/2007 | Luck et al. ................ | 382/103 |
| 7,587,083 B2 * | 9/2009 | Tabata et al. ............. | 382/162 |
| 7,596,241 B2 * | 9/2009 | Rittscher et al. ......... | 382/103 |
| 2005/0063565 A1 * | 3/2005 | Nagaoka et al. ......... | 382/104 |
| 2005/0105764 A1 * | 5/2005 | Han et al. ................. | 382/100 |
| 2006/0018516 A1 * | 1/2006 | Masoud et al. .......... | 382/115 |
| 2006/0269103 A1 * | 11/2006 | Brown et al. ............ | 382/103 |
| 2009/0041297 A1 * | 2/2009 | Zhang et al. ............. | 382/103 |

OTHER PUBLICATIONS

"Automated Detection of Human for Visual Surveillance System", Yuji Kuno, et al, Proceedings of the 13th International Conference on Pattern Recognition, vol. 3, Aug. 25-29, 1996, pp. 865-869.*

"Bayesian Human Segmentation in Crowded Situations," Tao Zhao et al, Proceedings of the 2003 IEEE Computer Society Conference on Computer Vision and Pattern Recognition (CVPR'03), vol. 2, 2003, pp. 459-466.*

Tao Zhao et al ("Tracking Multiple Humans in Complex Situations", Tao Zhao, et al, IEEE Transactions on Pattern Analysis and Machine Intelligence, vol. 26, No. 9, Sep. 2004, pp. 1208-1221.*

(Continued)

*Primary Examiner* — Wenpeng Chen
(74) *Attorney, Agent, or Firm* — McDermott Will & Emery LLP

(57) ABSTRACT

A human tracking system for tracking a plurality of humans in motion, in a video of the humans in motion, includes a human detection subsystem, and a combined tracker. The human detection subsystem is configured to generate a detection output by detecting the plurality of humans in a part-based representation, in each one of a sequence of static frames in the video. The human detection subsystem is further configured to account for partial occlusion of one or more of the humans in the image. The combined tracker is configured to receive and combine the detection responses generated by the human detection subsystem, and to track the humans in response to the received detection responses and image appearance properties.

36 Claims, 4 Drawing Sheets

OTHER PUBLICATIONS

"Tracking Multiple Humans in Complex Situations", Tao Zhao, et al, IEEE Transactions on Pattern Analysis and Machine Intelligence, vol. 26, No. 9, Sep. 2004, pp. 1208-1221.*

Zhao Tao, Nevatia Ram, Tracking multiple humans in crowded environment. Proceedings of the 2004 IEEE Computer Society Conference on Computer Vision and Pattern Recognition (CVPR'04). The Computer Society.

Davis, L. et al. 2000. Tracking humans from a moving platform, ICPR '00. vol. IV: 171-178.

Felzenszwalb, P. 2001. Learning Models for Object Recognition, CVPR 2001. vol. I: 1056-1062.

Gavrila, D.M. et al. 1999. Real-Time Object Detection for 'Smart' Vehicles, ICCV 1999. pp. 87-93.

Gavrila, D.M. 2000. Pedestrian Detection from a Moving Vehicle, ECCV 2000. vol. II: 37-49.

Leibe, B. et al. 2005. Pedestrian Detection in Crowded Scenes, CVPR 2005. vol. I: 878-885.

Mikolajczyk, K. et al. 2004. Human Detection Based on a Probabilistic Assembly of Robust Part Detector, ECCV 2004. vol. I: 69-82.

Mohan, A. et al. 2001. "Example—Based Object Detection in images by Components", IEEE Trans on PAMI, 23(4): 394-361, 2001.

Papageorgiou, C. et al. 1998. A Trainable Pedestrian Detection System, In: Proc. Of Intelligent Vehicles, 1998. pp. 241-246.

Viola, P. et al. 2003. Detecting Pedestrians Using Pattern of Motion and Appearance, ICCV 2003. pp. 734-741.

* cited by examiner

HUMAN DETECTION AND TRACKING SYSTEM

CROSS-REFERENCE TO RELATED APPLICATIONS

This application is based upon, and claims the benefit of priority under 35 U.S.C. §119(e) from U.S. Provisional Patent Application Ser. No. 60/826,790 (the "'790 provisional application"), filed Sep. 25, 2006, entitled "Human Detection And Tracking System". The content of the '790 provisional application is incorporated herein by reference in its entirety as though fully set forth.

STATEMENT REGARDING FEDERALLY SPONSORED RESEARCH

This work was made with government support under Grant No. MDA-904-03-C-1786, awarded by ARDA/DTO. The government has certain rights in the invention.

BACKGROUND

Robust detection of humans in images is important for many applications, such as visual surveillance, smart rooms, and driver assistance systems. While considerable progress has been made in detecting humans, locating multiple, possibly inter-occluded humans from static images remains a challenge.

Reliably tracking humans in videos is important for many applications, such as visual surveillance, and human computer interaction. There are a number of difficulties in performing this task. One difficulty is that the objects to be tracked need to be detected. While such detection is not difficult for moving, isolated humans viewed with a fixed camera and under fixed or slowly varying illumination, reliably detecting humans becomes a difficult problem in the presence of multiple humans with inter-object occlusion and/or a moving camera. Another difficulty is that the humans need to be tracked across the different frames with varying amounts of inter-object or scene occlusions. The image appearance of the objects changes not only with the changing viewpoints but even more strongly with the visible parts of the body and clothing. Further, it is more likely that the identities of objects may be switched during tracking when humans are close to each other.

Methods and systems for reliably detecting and tracking multiple, partially occluded humans are desired.

SUMMARY

A human detection system for detecting a plurality of humans in an image may include a full body detector, a plurality of part detectors, and a combined detector. The full body detector may be configured to generate a full body detection response for each human, by scanning the image to detect the full body of each human. Each one of the plurality of part detectors may be configured to generate a part detection response for each human, by scanning the image to detect an associated body part of each of the humans. The combined detector may be configured to combine all the full body detection responses and all the part detection responses, to generate a combined detection response for the humans. The detectors may account for partial occlusion of one or more of the humans in the image. The detectors may use a part-based representation that models each human as an assembly of parts that includes the full body part plus all the associated body parts.

A human tracking system for tracking a plurality of humans in motion, in a video of the humans in motion, may include a human detection subsystem, and a combined tracker. The human detection subsystem may be configured to generate a detection output by detecting the plurality of humans in a part-based representation, in each one of a sequence of static frames in the video. The human detection subsystem may further be configured to account for partial occlusion of one or more of the humans in the image. The combined tracker may be configured to receive and combine the detection responses generated by the human detection subsystem, and appearance based associations to track the plurality of humans in the video.

DETAILED DESCRIPTION

In the present disclosure, methods and systems are described for detecting multiple, partially occluded humans using a part-based representation. Edgelet features are introduced. Also disclosed in the present disclosure are methods and systems for part-based tracking of humans with occlusion.

Part-Based Detection of Humans with Occlusion

In the present disclosure, a part-based representation is used to detect multiple humans in a static image while allowing for at least partial occlusion of the humans in the image. The part based method of human detection is carried out in two levels: during a first level, the detection of parts of the human(s); during second level, the detection of the combination of the parts.

Figure 1:
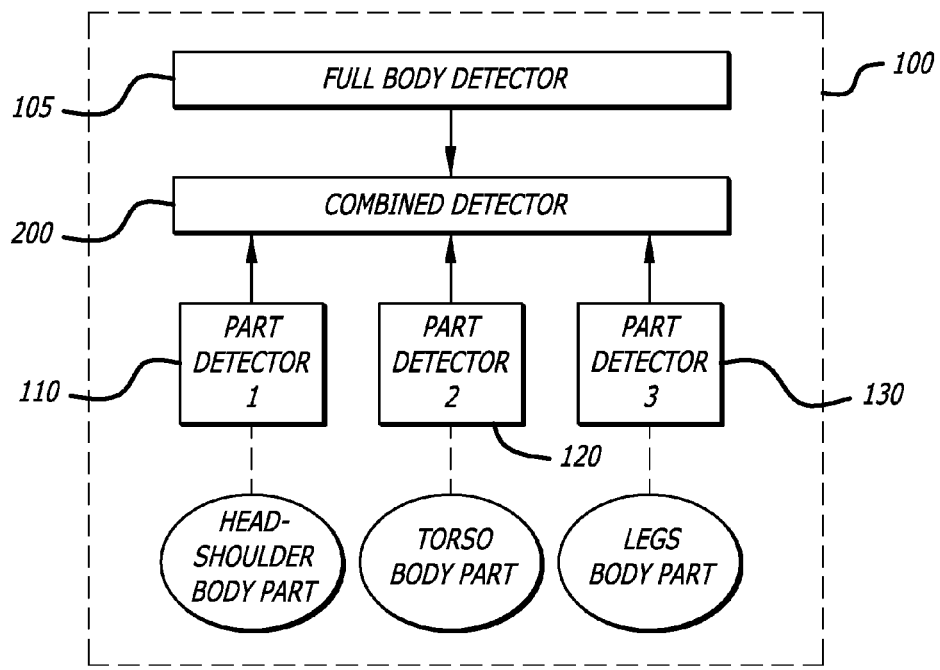
FIG. 1 is a schematic block diagram of a human detection system for detecting a plurality of humans in an image, in accordance with one embodiment of the present disclosure.

FIG. 1 is a schematic block diagram of system 100 for detecting multiple, partially occluded humans in a still image, in accordance with one embodiment of the present disclosure. In overview, the system 100 includes a full body detector 105; a plurality of part detectors 110, 120, and 130; and a combined detector 200. The full body detector 105 detects the full body of each human in the image. The part detectors each detect a specific body part, associated with a respective part detector, of each human in the image. For example, part detector 1 (110) is associated with the head-shoulder body part; part detector 2 (120) is associated with the torso body part; and part detector 3 (130) is associated with the legs body part.

For the first level of the part based representation, detectors are used that are learned from a set of silhouette oriented features introduced by the present disclosure. These features are called edgelet features, and consist of small connected chains of edges. Pairs of such chains may also form edgelet features. Edgelet features are suitable for human detection, because they are relatively invariant to clothing differences, unlike gray level or color features commonly used for face detection.

In the present disclosure, part detectors are learned by a boosting approach. Features of this boosting approach include: use of a real-valued AdaBoost algorithm; histogram weak classifiers that replace threshold weak classifiers; and a nested structure detector, which upgrades the cascade structured detector.

In the second level of the part based representation, the results of various part detectors are combined. In particular, a joint image likelihood function is defined for multiple humans. The joint image likelihood function is able to account for inter-occluded humans. A missing body part may be explained as the missing detection of the associated part detector, or occlusion by other objects.

In one embodiment, the part detectors may be learned by a learning subsystem that creates a set of edgelet features associated with one or more of the body parts of the humans, performs feature selection on the created set of edgelet features to select useful ones from the set of edgelet features, and builds and boosts classifiers using only the selected edgelet features.

In one embodiment of the present disclosure, the assumption is made when modeling inter-occlusion that the humans walk on a plane and that the image is captured by a camera looking down. Thus the relative depth of humans can be inferred from their image y-coordinates. The shape of a human is approximated by a 2D ellipse and the visibility of body parts is calculated according to the relative depth order of human objects. The multiple human detection problem is formulated as a maximum a priori (MAP) estimation problem. The solution space is searched, in order to find the best interpretation of the image observation.

Figure 2:
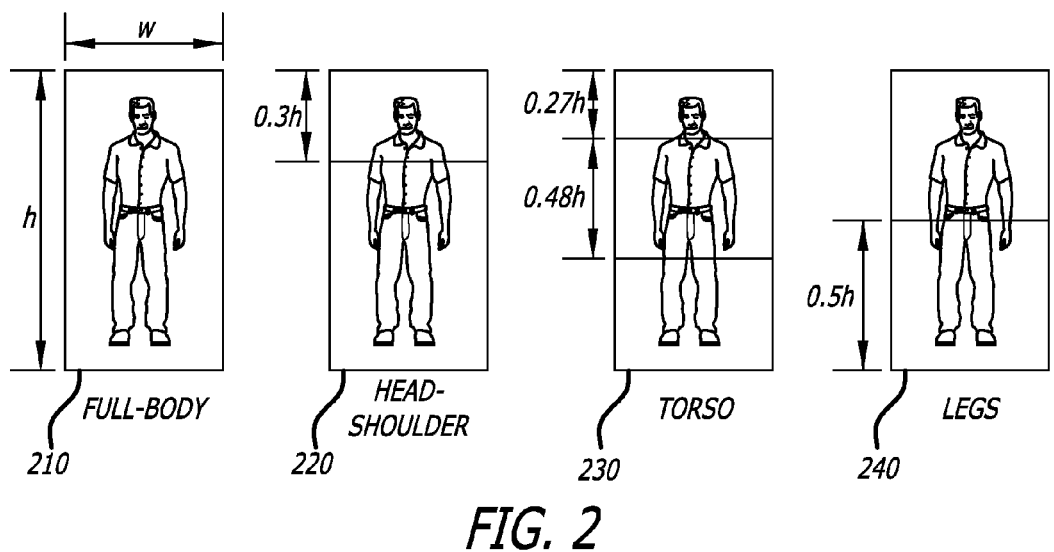
FIG. 2. illustrates a scheme for defining body parts of a human, in accordance with one embodiment of the present disclosure.

FIG. 2. illustrates a scheme for defining body parts of a human, in accordance with one embodiment of the present disclosure. FIG. 2 illustrates a scheme for defining body parts of a human, in accordance with one embodiment of the present disclosure. In the illustrated embodiment, the human body parts used to define each one of the individual humans are: 1) full body part 210; 2) head-shoulder body part 220; 3) torso body part 230; and 4) legs body part 240. Three part detectors are learned for the head-shoulder body part 200, the torso body part 230, and the legs body part 240. Besides the three part detectors, a full-body detector is also learned, for the full body part 210.

Figure 3:
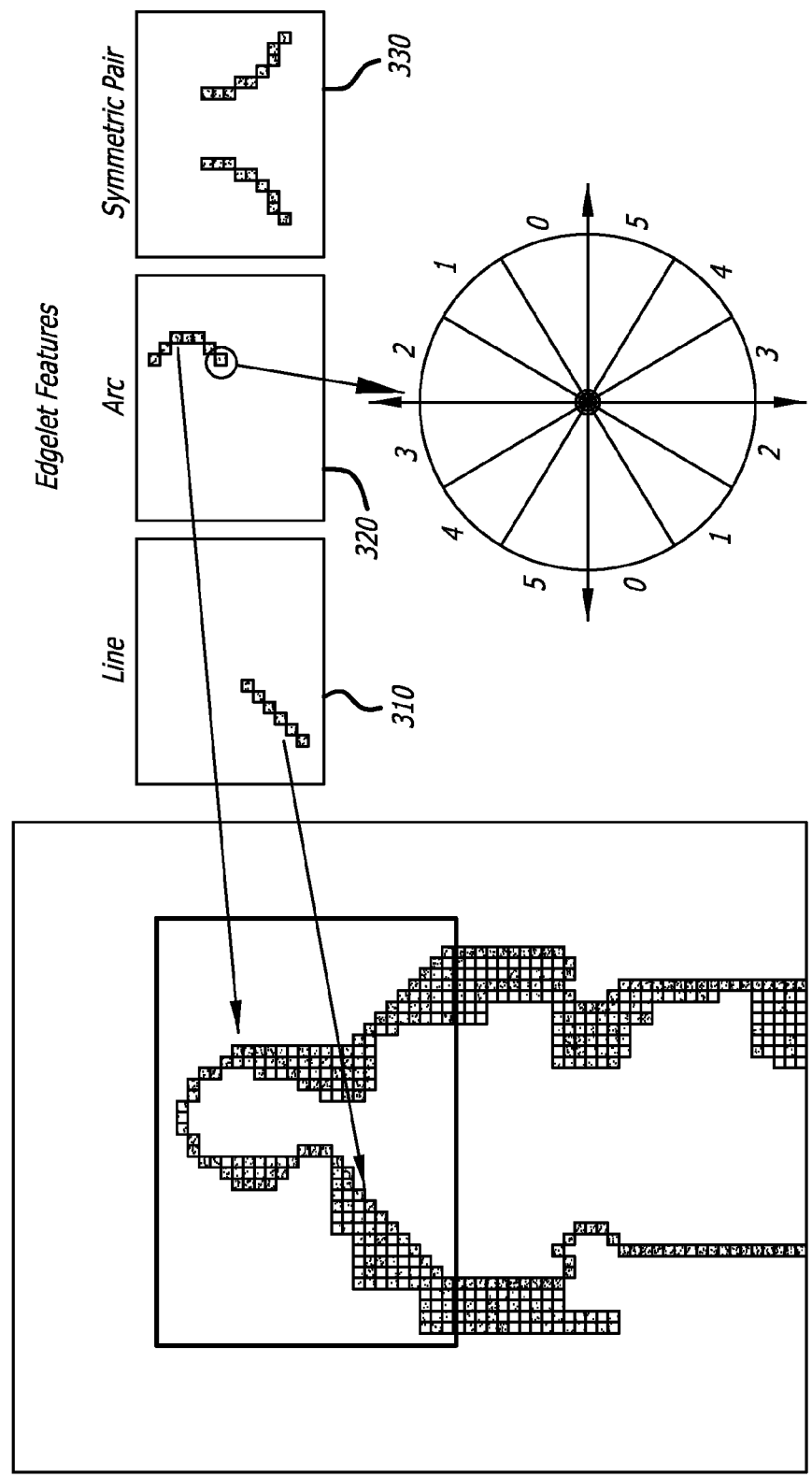
FIG. 3 illustrates exemplary edgelet features, in accordance with one embodiment of the present disclosure.

FIG. 3 illustrates exemplary edgelet features, in accordance with one embodiment of the present disclosure. As explained earlier, an edgelet may be viewed as a short segment of a line or curve. Put another way, an edgelet may be either a rectilinear curve, or a curvilinear curve. An edgelet that is a rectilinear curve or straight line is shown with reference numeral 310. An edgelet that is shaped as an arc or curvilinear curve is shown with reference numeral 210. Pairs of such curves may also form an edgelet feature, as illustrated by the symmetric pair labels with reference numeral 330. Typically, the head-shoulder detector may need more features than the other detectors. The full-body detector may needs many fewer features than any individual part detector.

An edgelet feature can be viewed as a function from the image space to the feature space. The affinity between the edgelet and the image I at position w may be calculated by an edgelet affinity function:

$$S(w) = (1/k)\sum_{i=1}^{k} M^I(u_i + w)|\langle n^I(u_i + w), n_i^E\rangle|.$$

In the above equation, the positions and normal vectors of the points in an edgelet are denoted by $\{u_i\}_{i=1}^{k}$ and $\{n_i^E\}_{i=1}^{k}$, where k is the length of the edgelet. Given an input image I, $M^I(p)$ and $n^I(p)$ denote the edge intensity and normal at position p of I.

The above edgelet affinity function captures both the intensity and the shape information of the edge. The intensity $M^I(p)$ and normal vector $n^I(p)$ may be calculated by 3×3 Sobel kernel convolutions. Since the edgelet features are used only as weak features for a boosting algorithm, they may be simplified for computational efficiency. First, the orientation of the normal vector may be quantized into six discrete values, as seen in FIG. 2. The range [0°, 180°) is divided into six bins evenly, which correspond to the integers from 0 to 5 respectively. An angle θ within range [180°, 360°) has the same quantized value as its symmetry 360°-θ. Then, the dot product between two normal vectors may be approximated by the following function:

$$l[x] = \begin{cases} 1 & x = 0 \\ 4/5 & x = \pm 1, \pm 5 \\ 1/2 & x = \pm 2, \pm 4 \\ 0 & x = \pm 3 \end{cases}$$

where the input x is the difference between two quantized orientations. The quantized edge orientations of the edgelet and the input image I may be denoted as $\{V_i^E\}_{i=1}^{k}$, and $V^I(p)$, respectively. The simplified affinity function is $$S(w) = (1/k)\sum_{i=1}^{k} M^I(u_i + w)l[V^I(u_i + w) - V_i^E].$$

In the embodiment illustrated in FIG. 3, the possible length of one single edgelet is from 4 pixels to 12 pixels. The edgelet features may be single edgelets, including lines, ⅛ circles, ¼ circles, and ½ circles, and their symmetric pairs. A symmetric pair of edgelets is the union of a single edgelet and its mirror. When the size of the reference window is 24×58, the overall number of possible edgelet features is 857,604.

The part detectors are learned using an enhanced form of a boosting method. In one exemplary embodiment, the part and full-body detectors may be learned with 1,742 positive and 6,000 negative samples for each boosting stage.

As noted earlier, an edgelet feature can be seen as a function from the image space to the feature space. An edgelet feature may be denoted as $f_{edgelet}$, and normalized to [0,1]. The range of $f_{edgelet}$ may be divided into n sub-ranges:

$$bin_j = [(j-1)/n, j/n), j=1, \ldots, n$$

In one embodiment, n may be 16.

This even partition on the feature space corresponds to a partition on the image space. For object detection problem, a sample is represented as {x, y}, where x is the image patch and y is the class label whose value can be +1 (object) or −1 (non-object). According to the real-valued version of the Ada-Boost algorithm, the weak classifier h based on $f_{edgelet}$ can be defined as:

If $f_{edgelet}(x) \in bin_j$ then $h(x) = \frac{1}{2}\ln\left(\frac{W^j_{+1}+\varepsilon}{W^j_{-1}+\varepsilon}\right)$ where $\varepsilon$ is a smoothing factor [11], and $W^j_l = P(f_{edgelet}(x) \in bin_j, y=l), l=\pm 1, j=1,\ldots,n$ Given the characteristic function $$B^j_n(u) = \begin{cases} 1 & u \in [j-1/n, j/n) \\ 0 & u \notin [j-1/n, j/n) \end{cases}, j=1,\ldots n$$

the weak classifier can be formulated as:

$$h(x) = \frac{1}{2}\sum_{j=1}^{n}\ln\left(\frac{W^j_{+1}+\varepsilon}{W^j_{-1}+\varepsilon}\right)B^j_n(f_{edgelet}(x))(f_{edgelet}(x)).$$

For each edgelet feature, one weak classifier may be built. Then a real AdaBoost algorithm may be used to learn strong classifiers, typically called layers, from the weak classifier pool. The strong classifier H may be a linear combination of a series of weak classifiers:

$$H(x) = \sum_{i=1}^{T} h_i(x) - b,$$

where T is the number of weak classifiers in H, and b is a threshold.

The learning procedure of one layer (or strong classifier) may be referred to as a boosting stage. At the end of each boosting stage, the threshold b may be tuned so that H has a high detection rate and new negative samples for the next stage are collected in a bootstrap way.

Finally, nested structured detectors may be constructed from these layers (or strong classifiers). One of the main advantages of this enhanced version s that the number of features needed to achieve a reasonable performance is greatly reduced.

To combine the results of part detectors, a likelihood of presence of multiple humans at the hypothesized locations is computed, i.e. a joint likelihood function is defined. If inter-object occlusion is present, the assumption of conditional independence between individual human appearances given the state, may not be valid and a more complex formulation is necessary.

As a first step, the state and the observation variables are formulated. The state of multiple humans is defined as $S=\{X_1,\ldots,X_m\}$, where m is the number of humans, which is unknown, and X is the state of the i-th human. In vectorial notation, $X=\{p, s\}$, where p is the image position and s is the size.

Figure 4:
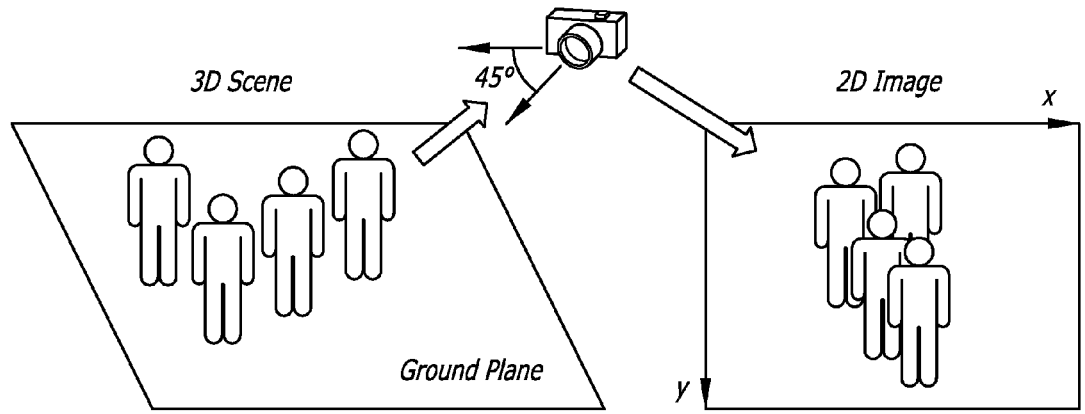
FIG. 4 illustrates a modeling of inter-object occlusion.

To model inter-object occlusion in one embodiment of the present disclosure, an assumption may be made that the humans walk on a ground plane and the image is captured by a camera looking down to the ground, as illustrated in FIG. 4. This assumption may be valid for common surveillance systems and many hand-hold photos. In this configuration, the following observations may be made: 1) if a human in the image is visible, then at least his/her head is visible and 2) the further the human from the camera, the smaller his/her y-coordinate. With the second observation, the relative depth of humans may be found by comparing their y-coordinates and building an occupancy map.

In one embodiment, the shape of an individual human may be modeled as an ellipse which is tighter than the box obtained by part detectors. From the occlusion map, the ratio of the visible area to the overall area of the part may be calculated. If the ratio is above a threshold (which may be set to 0.7 in one experiment), then the part may be classified as visible, otherwise occluded. The state of an individual part may also be defined as $P=\{p, s\}$. The state of all visible parts may be represented as:

$$S^* = \{\{P^{FB}_i\}_{i=1}^{m^{FB}}, \{P^{HS}_i\}_{i=1}^{m^{HS}}, \{P^T_i\}_{i=1}^{m^T}, \{P^L_i\}_{i=1}^{m^L}\},$$

where the superscripts FB, HS, T, and L stand for full-body, head-shoulder, torso and legs respectively, and $m^{FB}$, $m^{HS}$, $m^T$, $m^L$ are the numbers of the visible parts.

S* is a reduced version of the state vector S by removing all occluded body parts. The assumption can be made that the likelihoods of the visible parts in S* are conditional independent.

The responses of the full-body, head-shoulder, torso, and leg detectors may be denoted as:

$$Z = \{\{Z^{FB}_i\}_{i=1}^{n^{FB}}, \{Z^{HS}_i\}_{i=1}^{n^{HS}}, \{Z^T_i\}_{i=1}^{n^T}, \{Z^L_i\}_{i=1}^{n^L}\}.$$

In the above equation, $n^{FB}$, $n^{HS}$, $n^T$, $n^L$ denote the numbers of the responses, and $Z_i$ denotes a single response and in the same space as P. In order to detect body parts at different scales the input image may be resampled to build a scale pyramid with a scale factor of 1.2, then the image at each scale may be scanned by the detector with a step of 2 pixels.

Denoting Z as the observation and S* as the state, the following likelihood may be defined, to interpret the outcome of the part detectors on an input image I:

$$p(I|S) = p(Z|S^*) =$$

$$p(Z^{FB}|P^{FB})p(Z^{HS}|P^{HS})p(Z^T|P^T)p(Z^L|P^L)$$

In the above equation, $Z^P\{Z_i^P\}$ and $P^P=\{P_i^P\}$, P=FB, HS, T, L. The detector responses in Z and the parts in Š may be classified into three classes: successful detections (SD), false alarms (FA), and false negatives (FN), i.e. missing detections, denoted by $T_{SD}$, $T_{FA}$, and $T_{FN}$ respectively. The likelihood for one part, take head-shoulder as an example, may be calculated as:

$$p(Z^{HS}|P^{HS}) \propto \prod_{Z^{HS}_i \in T^{HS}_{SD}} p^{HS}_{SD} p(Z^{HS}_I | P(Z^{HS}_i)) \prod_{Z^{HS}_i \in T^{HS}_{FA}} p^{HS}_{FA} \cdot \prod_{Z^{HS}_i \in T^{HS}_{FN}} p^{HS}_{FN}$$

where $P(Z_i)$ maps a response to its correspond part, PSD is the reward of successful detection, $P_{FA}$ and $P_{FN}$ are the penalties of false alarm and false negative respectively, and $p(Z_i|P(Z_i))$ is the conditional probability of an detector response given its matched part.

Denoting by $N_{FA}$, $N_{SD}$ and $N_G$ the number of false alarms, the number of successful detections, and the ground-truth number of target objects respectively, $P_{FA}$ and $P_{FN}$ may be calculated by $$P_{FA} = \frac{1}{\alpha} e^{-\beta} \frac{N_{FA}}{N_{FA} + N_{SD}}, \ p_{SD} = \frac{1}{\alpha} e^{\beta} \frac{N_{SD}}{N_{FA} + N_{SD}},$$

where $\alpha$ is a normalization factor so that $P_{FA}+P_{FA}=1$ and $\beta$ is a factor to control the relative importance of detection rate vs. false alarms. $P_{FN}$ may be calculated by $P_{FN}=(N_G-N_{SD})/N_G$.

p(Z|P(Z)) is a Gaussian distribution. $N_{FA}$, $N_{SD}$, $N_G$ and p(Z|P(Z)) may all be learned from a verification set. For different detectors, $P_{SD}$, $P_{FA}$, $P_{FN}$ and p(Z|P(Z)) may be different.

In one embodiment of the present disclosure, the match between the responses and parts, i.e. P(Z), may be done in a greedy way. First, the distance matrix D of all possible response-part pairs may be calculated, i.e. D(i,j) may be the distance between the i-th response and the j-th part. Then in each step, the pair, denote by (i*, j*), with the smallest distance may be taken and the i*-th row and the j*-th column of D may be deleted. This selection may be done iteratively until no more valid pair is available. With the match P(Z), the sets $T_{SD}$, $T_{FA}$ and $T_{FN}$ are easily obtained.

A search is then performed for the best interpretation of the image.

As a first step in the search, the following method may be used to propose the candidate state S and search the solution space to maximize the posterior probability p(S|I).

According to Bayes' rule:

$$p(S|I) \propto p(I|S)p(S) = p(Z|S^*)p(S)$$

Assuming a uniform distribution of the prior p(S), the above MAP estimation is equal to maximizing the joint likelihood p(Z|S*). In one method described in the present disclosure, the initial candidate state S may be proposed based on the responses of the head-shoulder and full-body detectors. Then each human may be verified, with the above described likelihood model in their depth order. One exemplary algorithm may be the following:

An exemplary search may include the following steps:
1. Scan the image with the part and body detectors.
2. Propose initial state vector S from the responses of the head-shoulder and the full-body detectors.
3. Sort the humans according to their y-coordinate in a descending order.
4. For i=1 to m
5. Match the detector responses to the visible parts.
a) Calculate the image likelihood p(Z|S) and p(Z|S−{$X_i$}).
b) If p(Z|S−{$X_i$})>p(Z|S) then S←S−{$X_i$}.
Output S as the final result.

At the initial state, there may be two false alarms which get not enough evidence and are discarded later. The legs of the human in the middle may be occluded by another human and missed by the leg detector, but this missing part may be explained by inter-object occlusion, so that no penalty is put on it.

Figure 5A:
FIGS. 5A, 5B, and 5C illustrate exemplary detection results of edgelet part detectors.
Figure 5B:
Figure 5C:
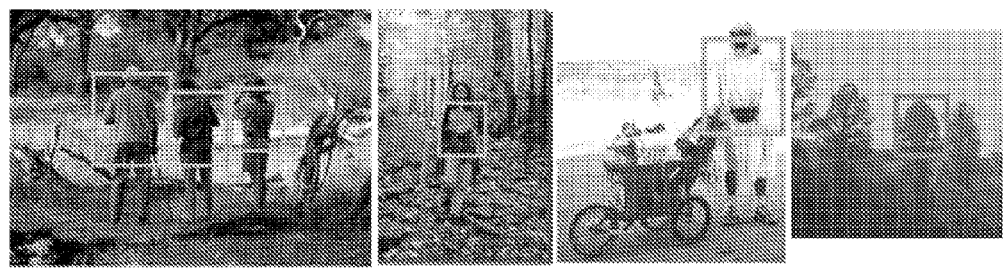

FIGS. 5A, 5B, and 5C illustrate exemplary detection results of edgelet part detectors. FIG. 5A illustrates exemplary detection results of full body part detectors. FIG. 5B illustrates exemplary detection results of head-shoulder part detectors. FIG. 5C illustrates exemplary detection results of torso part detectors.

Part-Based Tracking of Humans with Occlusion

In the present disclosure, methods and systems are disclosed for automatically tracking multiple, partially occluded humans in a walking or standing pose. A part based representation is used, so that occlusions do not affect the entire description as they would in a global representation. The approached described in the present disclosure uses part-based representation to track locations of multiple humans. In this approach, first the individual detected parts are tracked, then their responses are combined in a combined tracker. One advantage of this approach comes from the observation that under partial occlusion conditions, some parts of the object remain visible and distinguishable and can provide reliable cues for tracking. When the object is fully occluded, the tracks can only be inferred from the observables before and after.

For an automatic multiple object tracking system, three main problems need to be addressed: 1) when to initialize a trajectory? 2) how to track an object? and 3) when to terminate a trajectory?

In one embodiment of the present disclosure, an approach that relies on single frame human detection responses is used, as a response to all three questions above. Background modeling is not used, hence any special preprocessing for moving and/or zooming cameras is not required.

The tracking methods and systems described in the present disclosure are based on tracking parts of the human body. The parts are detected in each frame, which is treated as a single image. This is to avoid the necessity of computing reliable motion blobs and to be able to detect static humans as well as moving humans. In one embodiment, the same four-part representation used, as compared to the human detection system. The responses from the static part detectors are taken as the inputs for the tracker.

Figure 6:
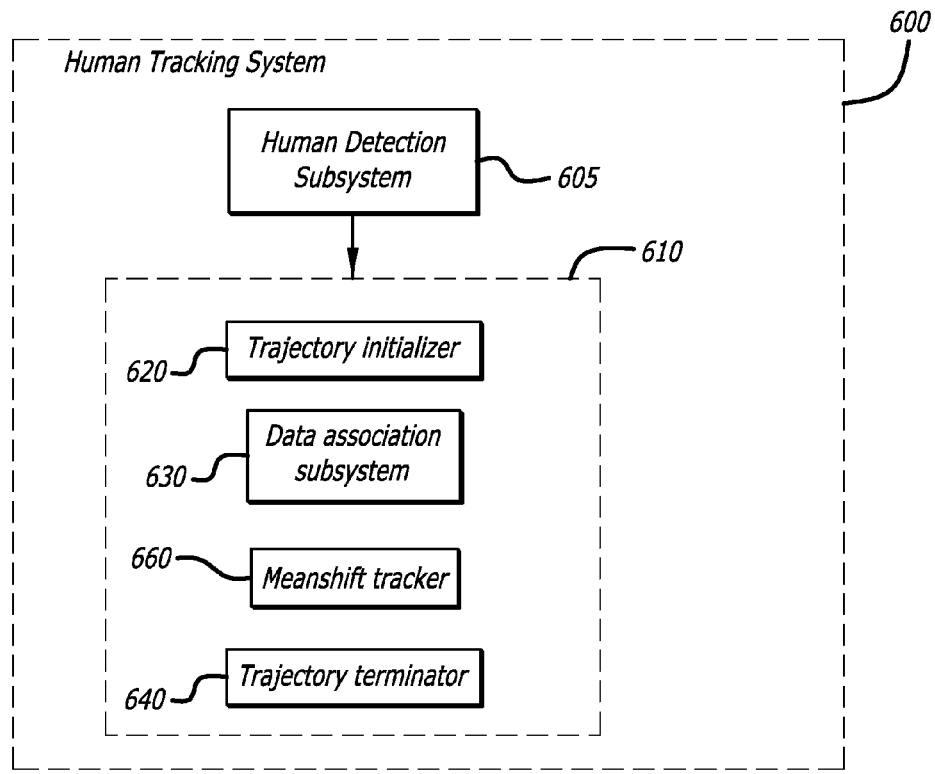
FIG. 6 is a schematic block diagram of a system for tracking multiple, partially occluded humans based on static body part detection, in accordance with one embodiment of the present disclosure.

FIG. 6 is a schematic block diagram of a system 600 for tracking multiple, partially occluded humans based on static body part detection, in accordance with one embodiment of the present disclosure. In overview, the human tracking system 600 includes: a human detection subsystem 605; and a combined tracker 610. The combined tracker 610 includes a trajectory initializer 620; a data association subsystem 630; and a trajectory terminator 640. In some embodiments of the present disclosure, a meanshift tracker may be used. The meanshift tracker is illustrated in FIG. 6 with reference numeral 660.

In one embodiment, the human tracking system 600 may include left and right profile views, as well as the frontal/rear view. In one embodiment, the human detection subsystem 605 may include four part detectors and a combined detector. In particular, the human detection subsystem 605 may have the same configuration as described in paragraph [0023] in conjunction with the human detection system 100, namely may include a full body detector, a plurality of part detectors, and a combined detector. The full body detector may be configured generate a full body detection response for each human by scanning the image to detect the full body of each human. Each one of the plurality of part detectors may be configured to generate a part detection response for each human by scanning the image to detect an associated body part of each of the humans. As illustrated in FIG. 2 and described in paragraph [028], the human body parts used to define each individual human may be the following: 1) head-shoulder; 2) torso; and 3) legs. The combined detector may be configured to combine all the full body detection responses with all the part detection responses, to generate a combined detection response.

The performance of the combined detector may generally be better than that of any single part detector in terms of the false alarm rate. However the combined detector does explicit reasoning only for inter-object partial occlusion, while the part detector can work in the presence of both inter-object and scene occlusions.

In one embodiment, humans are tracked by data association, i.e. matching the object hypotheses with the detected responses, whenever corresponding detection responses can be found. The hypotheses are matched with the combined detection responses first, as they are more reliable than the responses of the individual parts. If this fails, then an attempt is made to associate the hypotheses with the part detection responses. If this fails again, a meanshift tracker is used to follow the object. Most of the time, objects are tracked successfully by data association. The meanshift tracker gets utilized occasionally and for short periods only. Since this method is based on the part detection, it can work under both scene and inter-object occlusion conditions. Statistical sampling techniques are not used. A trajectory is initialized when evidence from new observations can not be explained by current hypotheses. A trajectory is terminated when it is lost by the detectors for a certain period.

In one embodiment, the human detection system 605 may be extended to include left and right profile views. For each body part, two detectors are learnt: one for the left profile view, and one for the frontal/rear view. The detector for right profile view is generated by flipping the left profile view one horizontally. Edgelet features are used in a nested cascade detector learned by using boosting methods, as described in conjunction with the human detection system illustrated in FIG. 1. In one exemplary embodiment, the training set may contain 1,700 positive samples for frontal/rear views, 1,120 for left profile view, and 7,000 negative images. When the positive training samples are captured from a variety of camera tilt angles, the learned detectors may work with a tilt angle within about [0°, 45°], where 0° is the horizontal view point.

For detection, the input image is scanned by all three detectors and the union of their responses is taken as the multi-view detection result.

In one embodiment, the responses of the detection system have three levels. The first level is a set of the original responses of the detectors. In this set, one object may have multiple corresponding responses. The second level is that of the merged responses, which are the results of applying a clustering algorithm to the original responses. In this set, one object may have at most one corresponding response, see FIG. 9B. The third level may be that of the combined responses. The second level results of all parts are the input of a combined detector, which computes the joint image likelihood of multiple humans by inter-object occlusion reasoning, and searches the hypotheses space to find the best interpretation. The output of the combined detector is a set of hypotheses, each of which has several matched part responses. The detection response may not be highly accurate spatially, because the training samples include some background region in order to cover some position and size variations.

Both the original and the merged responses are called part responses. A part response may be represented by a 5-tuple, $rp=\{l, p, s, f, c\}$, where l is a label indicating the part type; p is the image position (x, y) of the part; s is the size; f is a real-valued detection confidence; and c is an appearance model. The first four elements, l, p, s, and f, may be obtained from the detection process directly. The appearance model, c, may be implemented as a color histogram. The representation of a combined response is the union of the representations of its parts, with an additional visibility score v for each part, obtained from occlusion reasoning. If v is smaller than a threshold, 0, the part is considered occluded by other objects. Formally $rc=\{l_i, p_i, s_i, f_i, c_i, v_i\}_{i=FB,HS,T,L}$, where the index FB, HS, T, L stands for "full-body", "head-shoulder", "torso", and "legs" respectively.

Objects are detected frame by frame. In order to decide whether two responses, $rp_1$ and $rp_2$, from different frames belong to one object, an affinity measure may be defined by:

$$A(rp_1, rp_2) = A_{pos}(p_1, p_2) A_{size}(s_1, s_2) A_{appr}(c_1, c_2),$$

where $A_{pos}$, $A_{size}$, and $A_{appr}$ are affinities based on position, size, and appearance respectively.

The definitions of the affinities are as follows:

$$A_{pos}(p_1, p_2) = Y_{pos} \exp\left[\frac{(x_1-x_2)^2}{\sigma_x^2}\right] \exp\left[\frac{(y_1-y_2)^2}{\sigma_y^2}\right]$$

$$A_{size}(s_1, s_2) = Y_{size} \exp\left[\frac{(s_1-s_2)^2}{\sigma_s^2}\right]$$

$$A_{appr}(c_1, c_2) = B(c_1, c_2)$$

where $B(c_1, c_2)$ is the Bhattachayya distance between two color histograms and $\gamma_{pos}$ and $\gamma_{pos}$ are normalizing factors. The affinity between two combined responses, $rc_1$ and $rc_2$, is the average of the affinity between their common visible parts:

$$A(rc_1, rc_2) = n \frac{\sum_{i \in EPT} A(Pt_i(rc_1), Pt_i(rc_2)) I(v_{i1}, v_2 > \Theta_v)}{\sum_{i \in EPT} I(v_{i1}, v_2 > \Theta_v)}$$

where PT={FB, HS, T, L}, $Pt_i(rc)$ returns the response of the part i of the combined response rc, $v_{ij}$ is the visibility score of $Pt_i, (rc_j)$, j=1, 2, and I is an indicator function. The above affinity functions encode the position, size, and appearance information.

Data Association

The data association method is common to the three modules. The task of data association is to match the detection responses with the human hypotheses. In one embodiment, a greedy algorithm is used to do this. The initial assumption is made, at time t, that there are n hypotheses $H_1, \ldots, H_n$, whose predictions at time t+1 are $\hat{rc}_{t+1,1}, \ldots, \hat{rc}_{t+1,n}$, and at time t+1 there are m responses $rc_{t+1,1}, \ldots, rc_{t+1,m}$. First the m×n affinity matrix A is computed, of all $(\hat{rc}_{t+1,i}, rc_{t+1,j})$ pairs, i.e. $A(i,j)=A(\hat{rc}_{t+1,i}, rc_{t+1,j})$. Then in each step, the pair, denoted by (i*, j*), with the largest affinity is taken as a match and the i*-th row and the j*-th column of A are deleted. This procedure is repeated until no more valid pairs are available.

Trajectory Initialization

The basic idea of the initialization strategy is to start a trajectory when enough evidence is collected from the detection responses. Define the precision, pr, of a detector as the ratio between the number of successful detection and the number of all responses. If pr is constant between frames, and the detection in one frame is independent of the neighboring frames, then during consecutive T time steps, the probability that the detector outputs T consecutive false alarms is $P_{FA} = (1-pr)^T$. This inference is not accurate, however, for real videos, where the inter-frame dependence is large. If the detector outputs a false alarm at a certain position in the first frame, the probability is high that a false alarm will appear around the same position in the next frame. This is referred to as a persistent false alarm problem. Even here, the real $P_{FA}$ should be an exponentially decreasing function of T, which can be modeled as $e^{-\lambda_{init}T}$.

If T(>1) consecutive responses are found, $\{rc_1, \ldots, rc_T\}$ corresponding to one object hypothesis H by data association, the confidence of initializing a trajectory for H is then defined by:

$$InitConf(H; rc_{1\ldots T}) = \frac{1}{T-1}\sum_{t=1}^{T-1} A(\hat{rc}_{t+1}, rc_{t+1}) \cdot \left(1 - e^{-\lambda_{init}\sqrt{T}}\right)$$

The first term in the left side of Eq. 4 is the average affinity of the T responses, and the second term is based on the detector's accuracy. The more accurate the detector is, the larger the parameter $\lambda_{init}$ should be.

In one embodiment, the following trajectory initialization strategy may be adopted: if InitConf (H) is larger than a threshold, $\theta_{init}$, a trajectory is started from H, and H is considered to be a confident trajectory; otherwise H is considered to be a potential trajectory. A trajectory hypothesis H is represented as a 3-tuple, $\{\{rc_t\}_{t=1,\ldots,T}, D, \{C_i\}_{i=FB,HS,TS,L}\}$, where $\{rc_t\}$ is a series of responses, $\{C_i\}$ is the appearance model of the parts, and D is a dynamic model. In practice, $C_i$ is the average of the appearance models of all detection responses, and D is modeled by a Kalman filter for constant speed motion.

Trajectory Growth

After a trajectory is initialized, the object is tracked by two strategies, data association and meanshift tracking. For a new frame, for all existing hypotheses, their corresponding responses in this frame are searched for. If there is a new response matched with a hypothesis H, then H grows based on data association, otherwise a meanshift tracker is applied. The data association itself has two steps. First, all the hypotheses are matched with the combined responses using for example the method described above. Second, all hypotheses which are not matched in the first step are associated with the remaining part responses which do not belong to any combined response. Matching part responses with hypotheses is a simplified version of the method for matching combined responses with hypotheses. At least one part must be detected for an object to be tracked by data association.

Whenever data association fails (the detectors can not find the object or the affinity is low), a meanshift tracker 660 may be applied to track the parts individually. Then the results are combined to form the final estimation. The basic idea of meanshift is to track a probability distribution. The meanshift tracker 660 is configured to track a joint dynamic appearance distribution of the humans in the video.

Although the typical way to use meanshift tracking is to track the color distribution, there is no constraint on the distribution to be used. In one embodiment, the appearance model C, the dynamic model D and the detection confidence f, may be combined to build a likelihood map which is then fed into the meanshift tracker. A dynamic probability map, $P_{dyn}(u)$, where u represents the image coordinates, may be calculated from the dynamic model D. Denoting the original responses of one part detector at the frame j by $\{rp_j\}$, the detection probability map $P_{det}(U)$ is defined by:

$$P_{det}(u) = \Sigma_{j: u \in Reg(rp_j)} f_j + ms$$

where $Reg(rp_j)$ is the image region, a rectangle, corresponding to $rp_j$, $f_j$ is a real-valued detection confidence of $rp_j$, and ms is a constant corresponding to the missing rate (the ratio between the number of missed objects and the total number of objects). ms is calculated after the detectors are learned. The original response is used because of possible errors in the clustering algorithm.

Let $P_{appr}(u)$ be the appearance probability map. As C is a color histogram, $P_{appr}(u)$ is the bit value of C. To estimate C, the object needs to be segmented so that it can be known which pixels belong to the object. The detection response rectangle may not be accurate enough for this purpose. Also as a human is a highly articulated object, it may be difficult to build a constant segmentation mask. An iterative method may be used for upper body segmentation to verify the detected human hypotheses.

In one embodiment of the present disclosure, a simple PCA based approach may be adopted. At the training stage, examples may be collected and the object regions are labeled by hand. Then a PCA model may be learned from this data. Suppose an initial appearance model $C_0$ is provided. Given a new sample, the color probability map of the new sample may be calculated from $C_0$. The PCA model may then be used as a global shape constraint by reconstructing the probability map. The thresholded reconstruction map may be taken as the final object segmentation, which is used to update $C_0$. The mean vector may be used to compute $C_0$ the first time. For each part, a PCA model may be learned.

Combining $P_{appr}(u)$, $P_{dyn}(u)$, and $P_{det}(u)$, a image likelihood for a part at pixel u can be defined as:

$$L(u) = P_{appr}(u) P_{dyn}(u) P_{det}(u).$$

Before the meanshift tracker is activated, an interobject occlusion reasoning may be applied. Only the visible parts which were detected in the last successful data association may be tracked. Only the models of the parts which are not occluded and detected may be updated.

Trajectory Termination

In one embodiment, a strategy of terminating a trajectory may be used that is similar to that of initializing it. If no detection responses are found for an object H for consecutive T time steps, a termination confidence of H is computed by:

A non-transitory computer-usable medium may have stored therein computer-usable instructions for a processing system, wherein said instructions when executed by said processing system cause said processing system to: scan an image with a full body detector and part detectors; propose an initial state vector S from responses of one of the part detectors, and the full-body detector; sort, in descending order, a plurality of humans, according to a position coordinate; match responses of the detectors to visible ones of the body parts of the humans; for all the visible ones of the body parts of the humans, calculate an image likelihood p(Z|S) and an image likelihood p(Z|S−$\{X_i\}$); compare p(Z|S−$\{X_i\}$) with p(Z|S), and determine that S←S−$\{X_i\}$ if p(Z|S−$\{X_i\}$)>p(Z|S); and output S as the result.

The instructions when executed by said processing system may further cause said processing system to: learn one or more part detectors by creating a set of edgelet features associated with one or more of body parts of a plurality of humans in an image; perform feature selection on the created set of edgelet features to select useful ones from the set of edgelet features; and build and boost one or more classifiers by using the selected edgelet features.

EndConf (H; $rc_{1\ldots T}$)

$$\left(1 - \frac{1}{T-1}\sum_{t=1}^{T-1} A(\hat{rc}_{t+1}, rc_{t+1})\right)\left(1 - e^{-\lambda_{end}\sqrt{T}}\right)$$

The combined responses $rc_t$ may be obtained from the meanshift tracker, not from the combined detector. If End- Conf (H) is larger than a threshold, $\theta_{end}$, hypothesis H is terminated. This is called a dead trajectory. Otherwise, this is called an alive trajectory.

Combined Tracker

The above three modules, trajectory initialization, tracking, and termination, are put together. An exemplary tracking algorithm is provided below Let the set of hypotheses be F, initially F=$\phi$.

For each time step t (denote by $F_t$ the set of all alive trajectories in F at time t)

1. Static detection:
   (a) Detect parts. Let the result set be $RP_t$.
   (b) Combine part detection responses, including inter-object occlusion reasoning. Let the result set be $RC_t$.
   (c) Subtract the parts used in $RC_t$ from $RP_t$.

2. Data association:
   (a) Associate hypotheses in $F_t$ with combined responses in $RC_t$. Let the set of matched hypotheses be $F_{t1}$.
   (b) Associate hypotheses in $F_t$-$F_{t1}$ with part responses in $RP_t$. Let the set of matched hypotheses be $F_{t2}$.
   (c) Build a new hypothesis H from each unmatched response in $RC_t$, and add H into F and $F_t$.

3. Pure tracking: For each confident trajectory in $F_t$-$F_{t1}$-$F_{t2}$, grow it by meanshift tracking.

4. Model update:
   (a) For each hypothesis in $F_{t1}$+$F_{t2}$, update its appearance model and dynamic model.
   (b) For each potential trajectory in $F_{t1}$, update its initialization confidence.
   (c) For each trajectory in $F_{t1}$+$F_{t2}$, reset its termination confidence to 0.
   (d) For each trajectory in $F_t$-$F_{t1}$-$F_{t2}$, update its termination confidence.

Output all confident trajectories in F as the final results.

The above algorithm is called forward tracking, because it only looks ahead. Because the trajectory initialization may have some delay, a backward tracking procedure may also be used, which is the exact reverse of the forward tracking. After a trajectory is initialized, it may grow in both forward and backward directions.

A simplified version of the combined tracking method is to track only a single part, e.g. the full-body. Combined tracking outperforms the single part tracking.

Combined tracking method are robust because:

1. It uses combined detection responses, whose false alarm rate is low, to start trajectories. However this makes the initialization stage be able to work with inter-object occlusions, but not scene occlusion. One alternative is to start trajectories for part detection responses with the risk of having more false alarms.

2. The combined tracker uses all part responses to track the object. The probability that all part detectors fail at the same time is lower than the probability of a single part detector's failure.

3. In the tracking stage, this method can work with both scene and inter-object occlusions, because the object is tracked whenever any part of it is detected.

4. When tracking by meanshift, the combined method takes the average of the tracking results of all parts. If only one part drifts, the object can still be tracked.

In sum, methods and systems have been described for detecting and tracking humans in a part-based representation, including partial occlusion. A major advantage of the methods and systems described above is that simultaneous detection of multiple humans is made possible, using joint likelihood. Other advantages of tracking with a part-based representation include: 1) it can deal with partial occlusion, e.g. when the legs are occluded, the human can still be detected from the upper-body; 2) final decision is based on multiple evidence so that the false alarms can be reduced; and 3) it's more tolerant to the view point changes and the pose variation of articulated objects.

While certain embodiments have been described of human detection and tracking systems and methods, it is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited in the phrase "step for."

What is claimed is:

1. A human detection system for detecting a plurality of humans in an image of a scene, the system comprising:
   a full body detector configured to generate a full body detection response for each human by scanning the image of the scene to detect the full body of each human;
   a plurality of part detectors, each part detector configured to generate a part detection response for each human by scanning the image of the scene to detect an associated body part of each human; and
   a combined detector configured to combine all the full body detection responses with all the part detection responses, to generate a combined detection response;
   wherein the full body detection response and the part detection response is generated without referring to or in reference to any other image;
   wherein the full-body detector and the part detectors are further configured to account for partial occlusion of at least one of the humans in the image; and
   wherein the full-body detector and the part detectors are further configured to generate the full body and part detection responses in a part-based representation that models each one of the humans as an assembly of parts, the assembly of parts including a full body part plus all the associated body parts of that human.

2. The human detection system of claim 1, wherein the combined detector is configured to combine the full body responses and the part detection responses by defining and computing a joint likelihood function for the presence of the humans in the image, formulating a maximum a posteriori (MAP) estimation problem for the detection of the humans in the image, and searching a solution space of the MAP estimation problem to determine an optimal interpretation regarding the presence of the plurality of humans in the image.

3. The human detection system of claim 2, wherein the combined detector is further configured to search for the optimal interpretation of the image by:
   scanning the image with the full body detector and the part detectors;
   proposing an initial state vector S from the responses of one of the part detectors, and the full-body detector;

sorting, in descending order, the plurality of humans, according to a position coordinate;
matching the responses of the detectors to visible ones of the body parts of the humans;
for all the visible ones of the body parts of the humans, calculate an image likelihood p(Z|S) and an image likelihood p(Z|S−{$X_i$});
comparing p(Z|S−{$X_i$}) with p(Z|S), and determining that S←S−{$X_i$} if p(Z|S−{$X_i$})>p(Z|S); and
outputting S as the optimal interpretation of the image resulting from the search.

4. The human detection system of claim 1,
wherein the part-based representation comprises a four-part representation; and
wherein in said four-part representation the assembly of body parts for each human comprises: a head-shoulder body part of that human, a torso body part of that human, a legs body part of that human, and a full body part of that human; and
wherein the plurality of part detectors comprises a head-shoulder detector, a torso body part detector, and a legs body part detector.

5. The human detection system of claim 4, wherein the combined detector is further configured to define the joint likelihood function by modeling an inter-occlusion of at least some of the humans in the image.

6. The human detection system of claim 5,
wherein the joint likelihood function defined by the combined detector includes an image likelihood p(Z|S);
wherein for each one of the humans, the probability function p(Z|S) defines the likelihood of a response Z by the combined detector, given a state S of all the parts included in the assembly of parts for that human; and
wherein the response Z is a sum of the full body response from the full body detector and all the part responses from all the part detectors, and a mathematical formula for the response Z includes:

$$Z=\{\{Z_i^{FB}\}_{i=1}^{n^{FB}},\{Z_i^{HS}\}_{i=1}^{n^{HS}},\{Z_i^{T}\}_{i=1}^{n^{T}},\{Z_i^{L}\}_{i=1}^{n^{L}},$$

where $\{\{Z_i^{FB}\}_{i=1}^{n^{FB}}$ represents the response from the full-body detector;
$\{Z_i^{HS}\}_{i=1}^{n^{HS}}$ represents the response from the head-shoulder detector;
$\{Z_i^{T}\}_{i=1}^{n^{T}}$ represents the response from the torso detector;
$\{Z_i^{L}\}_{i=1}^{n^{L}}$ represents the response from the leg detector; and
$n^{FB}$, $n^{HS}$, $n^{T}$, and $n^{L}$ represent the number of responses from the full-body detector, the head-shoulder detector, the torso detector, and the leg detector, respectively.

7. The human detection system of claim 6,
wherein the image likelihood p(Z|S) is mathematically representable as a product of an individual probability function p($Z^{FB}$|$P^{FB}$) of the full body detector and the individual probability functions p($Z^{HS}$|$P^{HS}$), p($Z^{T}$|$P^{T}$), and p($Z^{L}$|$P^{L}$) of each of the part detectors; and
wherein a mathematical representation of the image likelihood p(Z|S) comprises:

$$p(Z|S)=p(Z^{FB}|P^{FB})p(Z^{HS}|P^{HS})p(Z^{T}|P^{T})p(Z^{L}|P^{L}),$$

where $P^{FB}$, $P^{HS}$, $P^{T}$, and $P^{L}$ each represents the state of the full-body part, the head and shoulder part, the torso part, and the leg part, respectively; and
where the probability functions p($Z^{FB}$|$P^{FB}$), p($Z^{HS}$|$P^{HS}$), p($Z^{T}$|$P^{T}$), and p($Z^{L}$|$P^{L}$) for the full body detector and the part detector each represents the conditional probability of a response of a detector given a matched part that is matched to the response, and
wherein the combined detector is further configured to perform the match between the responses and the matched parts.

8. The human detection system of claim 7, wherein a mathematical expression for an individual probability function p($Z^{HS}$|$P^{HS}$) comprises:

$$p(Z^{HS}|P^{HS}) \propto \prod_{Z_i^{HS} \in T_{SD}^{HS}} p_{SD}^{HS} p(Z_i^{HS}|P(Z_i^{HS})) \prod_{Z_i^{HS} \in T_{FA}^{HS}} p_{FA}^{HS} \cdot \prod_{Z_i^{HS} \in T_{FN}^{HS}} p_{FN}^{HS}$$

wherein the individual probability function p($Z^{HS}$|$P^{HS}$) represents the likelihood that a part that has a state $P^{HS}$ be found in a state $Z^{H}$;
P($Z_i$) represents a map of a response $Z_i$ to its corresponding part;
PSD represents a reward for a successful detection;
$P_{FA}$ and $P_{FN}$ represent penalties for false alarm and false negative respectively; and
p($Z_i$|P($Z_i$)) represents the conditional probability of a detector response $Z_i$ given its matched part.

9. The human detection system of claim 7,
wherein the combined detector is configured to implement a greedy matching algorithm to perform the match between the responses and the body parts of the humans, and
wherein the combined detector is configured to implement the greedy matching algorithm by:
calculating a distance matrix D including a plurality of elements D(i,j), each element D(i,j) of the distance matrix D representing a distance between an i-th response and a j-th body part;
deleting a minimum element from all of the plurality of elements D(i,j) in the matrix D, the minimum element representing the smallest distance between any of the responses and any of the body parts;
re-calculating the distance matrix D, then deleting a minimum one of the re-calculated distance matrix; and
repeating the steps of re-calculating the distance matrix and deleting the minimum element of the re-calculated distance matrix, until no valid matcheable pair remains available between the responses and the body parts.

10. The human detection system of claim 1,
wherein at least some of the part detectors are configured to be learned by a learning subsystem that creates a set of edgelet features associated with one or more body parts of the humans, performs feature selection on the created set of edgelet features to select useful ones from the set of edgelet features, and builds and boosts classifiers using only the selected edgelet features.

11. The human detection system of claim 10,
wherein the part detectors have a nested cascaded structure; and
wherein the human detection system comprises a learning subsystem configured to:
build one weak classifier for each one of the set of edgelet features, thereby creating a pool of weak classifiers;
learn one or more strong classifiers from the pool of weak classifiers,
construct the plurality of part detectors from the one or more strong classifiers.

12. The human detection system of claim 10,
wherein each edgelet feature comprises a segment of a curve, the curve comprising one of a rectilinear curve and a curvilinear curve; and wherein each edgelet feature describes one or more silhouette patterns of its associated body part.

13. The human detection system of claim 10,
wherein each edgelet feature is defined as a function from an image space defined for the image to a feature space defined for that edgelet feature, the function comprising an edgelet affinity function that provides information about a shape and an intensity of an edge of the body part associated with the edgelet feature; and
wherein the combined detector is further configured to compute the edgelet affinity function of each selected edgelet feature.

14. The human detection system of claim 13,
wherein for each edgelet feature, the edgelet affinity function outputs an affinity value between that edgelet feature and the image, at a given position on the image; and
wherein the mathematical formulation of the edgelet affinity function comprises:

$$S(w) = (1/k)\sum_{i=1}^{k} M^I(u_i + w) |\langle n^I(u_i + w), n_i^E \rangle|,$$

where $S(w)$ denotes the affinity value at a position $w$ within the image;
$\{u_i\}_{i=1}^{k}$ denotes the positions of a plurality of points in the edgelet;
$\{n_i^E\}_{i=1}^{k}$ denotes the normal vectors of said plurality of points in the edgelet;
$k$ denotes the length of the edgelet;
$I$ denotes the image;
$M^I(p)$ denotes the intensity of the edge at a position $p$ of the image $I$; and
$n^I(p)$ denotes the normal vector at the position $p$ of $I$.

15. The human detection system of claim 1:
wherein each part detector is an edgelet part detector configured to learn from one or more classifiers that are built with a set of edgelet features, and wherein each one of the set of edgelet features is defined as an edgelet affinity function that provides information about a shape and an intensity of an edge of the body part associated with the edgelet feature.

16. The edgelet part detector of claim 15, wherein the mathematical formulation of the edgelet affinity function comprises:

$$S(w) = (1/k)\sum_{i=1}^{k} M^I(u_i + w) |\langle n^I(u_i + w), n_i^E \rangle|,$$

where $S(w)$ denotes the affinity value at a position $w$ within the image;
$\{u_i\}_{i=1}^{k}$ denotes the positions of a plurality of points in the edgelet;
$\{n_i^E\}_{i=1}^{k}$ denotes the normal vectors of said plurality of points in the edgelet;
$k$ denotes the length of the edgelet;
$I$ denotes the image;
$M^I(p)$ denotes the intensity of the edge at a position $p$ of the image $I$; and
$n^I(p)$ denotes the normal vector at the position $p$ of $I$.

17. The human detection system of claim 1 wherein:
the human detection system is configured to generate static detection responses by detecting a plurality of humans, in each one of a sequence of static frames in a video on a frame by frame basis; and further comprising
a combined tracker configured to receive and combined the static detection responses, and to track the humans using the received static detection responses as input.

18. The human detection system of claim 17, wherein the combined tracker is further configured to track the humans by generating an estimate of a trajectory of the motion of the humans.

19. The human detection system of claim 17, wherein the combined tracker comprises:
a trajectory initializer configured to initialize a trajectory of the motion of the humans;
a data association subsystem configured to perform data association by matching the received detection responses with one or more human hypotheses; and
a trajectory terminator configured to terminate the trajectory so that an estimate of the trajectory can be generated by the combined tracker.

20. The human detection system of claim 17,
further comprising a meanshift tracker configured to perform meanshifting by individually tracking the body parts of the humans if the data association performed by the data association subsystem fails; and
wherein the combined tracker is further configured to combine the results of the meanshifting for all of the body parts of the humans so as to generate the estimate of the trajectory of the motion of the humans.

21. The human detection system of claim 17 further comprising a meanshift tracker configured to track a joint dynamic appearance distribution of the humans in the video.

22. The human detection system of claim 17,
wherein the detection output from the human detection system comprises a set of human hypotheses; and
wherein each one of the human hypotheses has a plurality of matched part responses.

23. The human detection system of claim 17, further comprising a trajectory initializer configured to determine when evidence from all the detection responses received from the human detection system is sufficient to start the trajectory.

24. The human detection system of claim 23,
wherein the trajectory initializer is further configured to determine a confidence of initializing a trajectory for an object hypothesis H, after two or more consecutive responses corresponding to the object hypothesis H have been found.

25. The human detection system of claim 17 further comprising a data association subsystem configured to match the response with the human hypotheses using a greedy algorithm that computes a matrix of affinity pairs, then in each one of a plurality of steps, chooses a pair having the largest affinity as a match and deletes the corresponding row and column of the matrix, repeating these steps until no more valid pairs are available.

26. The human detection system of claim 17 further comprising a trajectory terminator configured to compute a termination confidence in an object hypothesis H, after two or more consecutive responses corresponding to the object hypothesis H have been found.

27. A method of detecting partly occluded humans in an image of a scene, the method comprising:
generating a full body detection response by scanning the image of the scene to detect an associated full body of each of the humans;
generating a plurality of part detection responses by scanning the image of the scene to detect an associated body part of each of the humans; and combining the full body detection response with all the part detection responses to generate a combined detection response;

wherein the full body detection response and the part detection response is generated without referring to or in reference to any other image;

wherein the acts of generating the full body detection response and the part detection responses comprise accounting for a partial occlusion in the image of one or more of the humans, and wherein the acts of generating the full body detection response and the part detection responses are performed using a part-based representation that models each of the humans as an assembly of parts that includes a full body part as well as all the associated body parts of that human.

28. The method of claim 27, wherein the act of generating a combined detection response comprise the acts of:

defining and computing a joint likelihood function for the detection responses;

formulating a maximum a posteriori (MAP) estimation problem for the detection of the humans; and searching a solution space of the MAP estimation problem to determine an optimal interpretation regarding a presence of the plurality of humans in the image.

29. The method of claim 28, wherein the act of searching the solution space of the MAP estimation problem to determine the optimal interpretation regarding the presence of the plurality of humans in the image comprises:

scanning the image with the full body detector and the part detectors;

proposing an initial state vector S from the responses of one of the part detectors, and the full-body detector;

sorting, in descending order, the plurality of humans, according to a position coordinate;

matching the responses of the detectors to visible ones of the body parts of the humans;

for all the visible ones of the body parts of the humans, calculate an image likelihood $p(Z|S)$ and an image likelihood $p(Z|S-\{X_i\})$;

comparing $p(Z|S-\{X_i\})$ with $p(Z|S)$, and determining that $S \leftarrow S-\{X_i\}$ if $p(Z|S-\{X_i\})>p(Z|S)$; and outputting S as the result.

30. The method of claim 27, wherein the act of generating a plurality of part detection responses comprises:

learned the part detectors by creating a set of edgelet features associated with one or more of the body parts of the humans;

performing feature selection on the created set of edgelet features to select useful ones from the set of edgelet features; and building and boosting one or more classifiers by using the selected edgelet features.

31. The method of claim 30, wherein the act of building and boosting the one or more classifiers comprises:

building one weak classifier for each one of the set of edgelet features, so as to create a pool of weak classifiers;

learning one or more strong classifiers from the pool of weak classifiers, each strong classifier learned at a corresponding boosting stage, and each strong classifier representing a layer; and constructing the plurality of part detectors from the one or more strong classifiers.

32. The method of detecting of claim 27 further comprising:

creating a set of edgelet features associated with one or more of the body parts of the humans;

performing feature selection on the created set of edgelet features to select useful ones from the set of edgelet features; and building and boosting one or more classifiers using only the selected edgelet features.

33. The method of claim 32, wherein the act of building and boosting the classifiers comprises:

building one weak classifier for each one of the set of edgelet features, so as to create a pool of weak classifiers;

learning one or more strong classifiers from the pool of weak classifiers, each strong classifier learned at a corresponding boosting stage, and each strong classifier representing a layer; and constructing the plurality of part detectors from the one or more strong classifiers.

34. The method of detecting of claim 27 further comprising:

generating static detection responses by detecting the humans in each one of a sequence of static frames of a video, with a part-based representation of the humans;

receiving and combining the static detection responses; and tracking the humans using the combined static detection responses as input.

35. A non-transitory computer-usable medium having stored therein computer-usable instructions for a processing system, wherein said instructions when executed by said processing system cause said processing system to:

scan an image with a full body detector and part detectors;

propose an initial state vector S from a responses of one of the part detectors, and the full-body detector;

sort, in descending order, a plurality of humans, according to a position coordinate;

match responses of the detectors to visible ones of body parts of the humans;

for all the visible ones of the body parts of the humans, calculate an image likelihood $p(Z|S)$ and an image likelihood $p(Z|S-\{X_i\})$;

compare $p(Z|S-\{X_i\})$ with $p(Z|S)$, and determine that $S \leftarrow S-\{X_i\}$ if $p(Z|S-\{X_i\})>p(Z|S)$; and output S as the result.

36. The non-transitory computer-usable medium of claim 35 wherein said instructions when executed by said processing system further cause said processing system to:

learn one or more part detectors by creating a set of edgelet features associated with one or more of body parts of a plurality of humans in an image;

perform feature selection on the created set of edgelet features to select useful ones from the set of edgelet features; and build and boost one or more classifiers by using the selected edgelet features.

* * * * *